(12) United States Patent
Oh (10) Patent No.: US 7,861,138 B2
(45) Date of Patent: Dec. 28, 2010

(54) ERROR CORRECTION IN MEMORY DEVICES

(75) Inventor: Jong-Hoon Oh, Chapel Hill, NC (US)

(73) Assignee: Qimonda AG, Munich (DE)

( * ) Notice: Subject to any disclaimer, the term of this patent is extended or adjusted under 35 U.S.C. 154(b) by 1057 days.

(21) Appl. No.: 11/566,774

(22) Filed: Dec. 5, 2006

(65) Prior Publication Data
US 2008/0133994 A1 Jun. 5, 2008

(51) Int. Cl.
*G11C 29/00* (2006.01)
(52) U.S. Cl. ...................................................... 714/763
(58) Field of Classification Search ................. 714/763, 714/710–711
See application file for complete search history.

(56) References Cited

U.S. PATENT DOCUMENTS 5,937,423 A * 8/1999 Robinson .................... 711/103
6,134,681 A * 10/2000 Akamatsu et al. ........... 714/710
2006/0059406 A1* 3/2006 Micheloni et al. ........... 714/763

OTHER PUBLICATIONS

NN8906375: Error Correction Codes With Address Checking; IBM Technical Disclosure Bulletin, vol. 32;Issue # 1,p. 375-377; Jun. 1, 1989.*

* cited by examiner

*Primary Examiner*—Guy J Lamarre
(74) *Attorney, Agent, or Firm*—Patterson & Sheridan, LLP (57) ABSTRACT

Embodiments of the invention generally provide a method and apparatus for correcting errors in a memory device. In one embodiment, the method includes receiving a read command and a read address for the read command and reading data from a first location of the memory device corresponding to the read address. The method also includes reading error correction information corresponding to the read address. If the error correction information indicates an error in the data, the error in the data is corrected to produce corrected data and the corrected data is output from the memory device. The corrected data is also written back to a second location in the memory device corresponding to the read address.

33 Claims, 11 Drawing Sheets

ERROR CORRECTION IN MEMORY DEVICES

BACKGROUND OF THE INVENTION

Modern computer systems typically contain a memory device such as a dynamic random access memory (DRAM), synchronous DRAM (SDRAM), double-data rate DRAM (DDR-DRAM), low power DDR-DRAM (LP DDR-DRAM) or other memory device which may be used to store data for the computer system. Typically, such devices include an array of memory cells (referred to as a memory array) which may be used to store data for the memory device. In some cases, a memory device may be manufactured which includes a defect in one or more of the cells of the memory array. Sometimes, such a defect may not be detected or become evident until after the memory device has been provided to a user.

Some memory devices include circuitry to detect, and correct the results of errors arising from a defect. For example, in order to detect and correct an error, the memory device may store error correction information which describes what data stored in the memory array should be. If data retrieved from the memory array does not match the description provided by the error correction information, then the error may be successfully detected. Also, in some cases, the error correction information may be used to correct the error by providing enough description to change the incorrect data resulting from the error to make the data correct. In order to provide a description of the correct data, the error correction information may be originally generated from the data when the data is presumed to be correct (e.g., the error correction information may be generated from the data when the data is received from another device).

In order to provide error correction and detection for data stored in a memory array, the memory device typically provides storage space for the error correction information. Thus, increases in the amount of error correction information represent additional cost in the memory device. For example, to correct an error in a single bit (referred to as a single-bit error, or SBE) of an eight-bit data item (a byte), four bits of error correction information may be used. Because fours bits of error correction information may be used to correct a single bit error in eight bits of information, providing additional storage in the memory device for the error correction information represents a 50 percent overhead cost.

In some cases, the relative cost of providing error correction information may decrease as the number of bits being corrected increases. For example, to correct a single-bit error in a 32-bit data item (four bytes), only six bits of error correction information may be used, such that the overhead cost for the error correction information is only about 20 percent. Because the relative cost of providing error correction decreases as the amount of data being corrected increases, there may be a desire to group larger amounts of data together when providing error correction information for the grouped data.

As described above, error correction information may be generated from the group of data which is correctable using the error correction information. Thus, to provide error correction information for four bytes of data, all four bytes of data are usually used to generate the error correction information. In some cases, there may be a desire to modify only a single byte of the four bytes of data (e.g., by performing a single byte write to one byte of the four bytes of data). In this case, the modified single byte is presumably error-free at the time of being written to. However, the other three bytes in the group may already contain an error when the modified byte is written to. As a result, error correction information generated using the three unmodified bytes and the one modified byte may itself contain an error. Thus, where a single byte in the group of data is modified without first detecting the error in another byte in the group, error correction information generated from the group of data may be incorrect.

Accordingly, what is needed is an improved error correction method and apparatus.

SUMMARY OF THE INVENTION

Embodiments of the invention generally provide a method and apparatus for correcting errors in a memory device. In one embodiment, the method includes receiving a read command having a read address, reading data from a first location of the memory device corresponding to the read address and reading error correction information corresponding to the read address. If the error correction information indicates an error in the data, corrected data is produced. The corrected data is written back to a second location in the memory device corresponding to the read address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide a method and apparatus for correcting errors in a memory device. In one embodiment, the method includes receiving a read command and a read address, reading data from a first location of the memory device corresponding to the read address and reading error correction information corresponding to the read address. If the error correction information indicates an error in the data, the error is corrected to produce corrected data and the corrected data is output from the memory device. The corrected data is also written back to a second location in the memory device corresponding to the read address. In some cases, by writing the corrected data back to a location in the memory device, subsequent errors may be corrected, as described below.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Figure 1A:
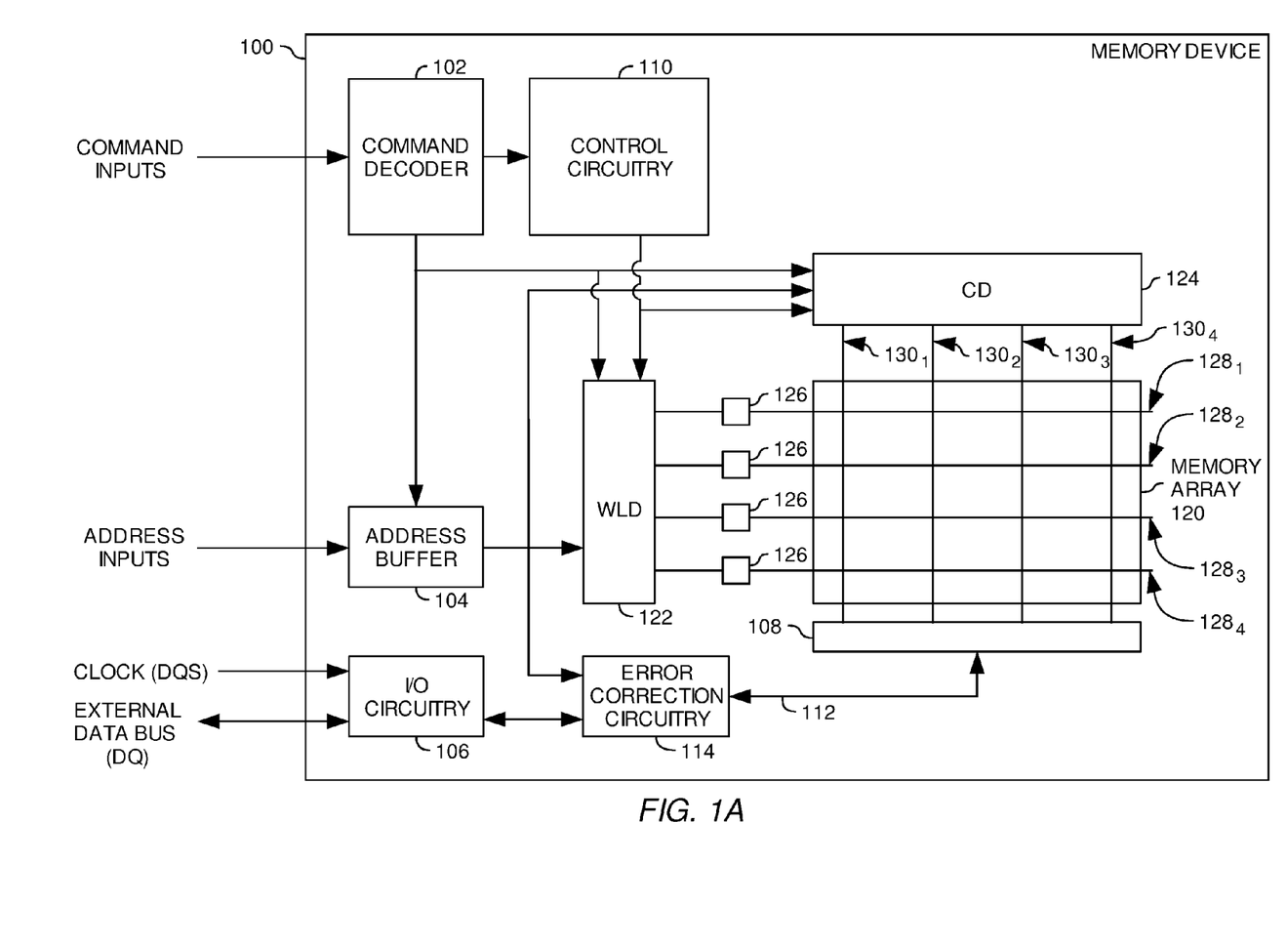
FIG. 1A is a block diagram depicting a memory device according to one embodiment of the invention.

FIG. 1A is a block diagram depicting a memory device 100 according to one embodiment of the invention. The memory device 100 may include address inputs, command inputs, a clock input, and an external data bus (DQ). The address inputs may be received by an address buffer 104 and the command inputs may be received by a command decoder 102. The clock input and external data bus may be received by input/output (I/O) circuitry 106 and used to input and output data to and from a memory array 120 corresponding to access commands and addresses received via the command and address inputs. In some cases, the clock input may also be used to control the address buffer 104 and/or command decoder 102.

In one embodiment, the memory array may provide dynamic random access memory (DRAM) storage for data in the memory device 100. Embodiments of the invention may also be utilized with any type of volatile memory device such as a synchronous DRAM (SDRAM), double-data rate DRAM (DDR-DRAM), low power DDR-DRAM (LP DDR-DRAM) or other memory device. The memory array 120 may have a given width, which may refer to the number of bitlines in the memory array 120 which are used to read from or write to the memory array 120. Thus, the width of the memory array 120 may include redundant bitlines which are used to replace faulty bitlines in the memory array 120 but may not include redundant bitlines which are not used or faulty bitlines which have been replaced.

During an access, the address inputs may be used by a wordline decoder 122 and column decoder 124 to access memory cells in a memory array 120. For example, using a received address, the column decoder 124 may select bitlines 130 of the memory array 120 to be accessed. Similarly, the wordline decoder 126 may select wordlines 128 to be accessed using the received address. In some cases, an access may also occur based on an address which is internally generated.

During an access, after an address has been used to select wordlines and bitlines in the memory array 120, data may be written to and/or read from the memory array 120 via internal read/write circuitry 108 which may include circuitry such as sense amps, output buffers, etc. Data for the access may be transmitted between the read/write circuitry 108 for the memory array 120 and error correction circuitry 114 via one or more internal data buses 112. The error correction circuitry is described below in greater detail. Data for the memory device 100 may be input and output via the external I/O circuitry 106. While depicted with respect to a single memory array 120, the memory device 100 may also include additional memory arrays as known to those skilled in the art. Furthermore, the combination of features and elements described above with respect to FIG. 1 is merely one example of a memory device configuration with which embodiments of the invention may be used. In general, embodiments of the invention may be utilized with any type of memory device 100.

Figure 1B:
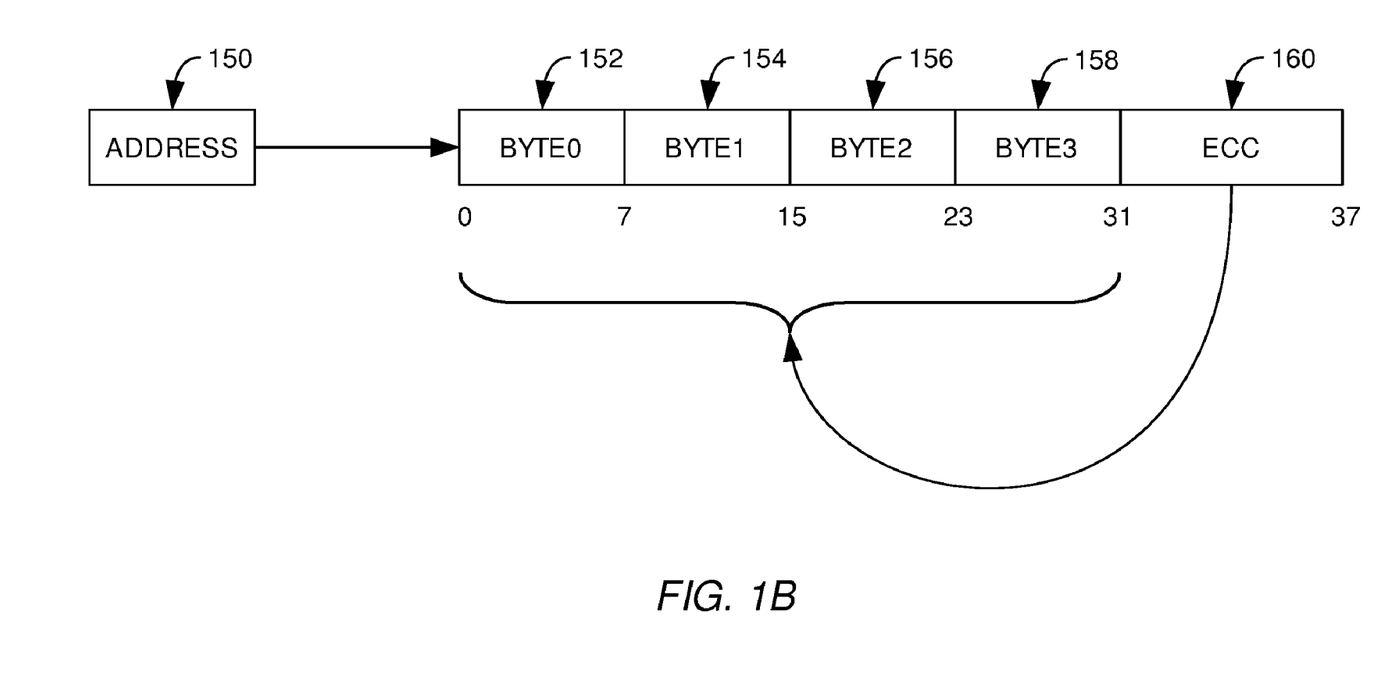
FIG. 1B is a block diagram depicting error correction information stored in the memory device according to one embodiment of the invention.

In one embodiment of the invention, the memory device 100 may be configured to provide error correction information for data stored in the memory device 100. The error correction information may be used to both detect and correct errors in data stored in the memory device 100. FIG. 1B is a block diagram depicting exemplary error correction information 160 (also referred to as an error correction code, or ECC) stored for a group of data bytes 152, 154, 156, 158 according to one embodiment of the invention. As depicted, the group of bytes 152, 154, 156, 158 may be stored beginning at a given address 150. The error correction information may also be stored in a location associated with the address 150. For example, in one embodiment of the invention, each byte 152, 154, 156, 158 may be accessed via the same wordline 128 in the memory array 120 while each being stored in a separate column. The error correction information 160 may also be accessed via the same wordline in the memory array 120. Also, embodiments of the invention may be utilized where the error correction information is stored in a separate location in the memory device 100 (e.g., in a separate memory array or portion of the memory) or in a location other than the memory device 100.

In one embodiment of the invention, the error correction information 160 may be used to provide error detection and correction for errors in the group of bytes 152, 154, 156, 158. For example, the error correction information may be configured to detect a single bit error (SBE) in one of the four bytes 152, 154, 156, 158 and also to correct the error when it is detected. In order to provide the detection and correction capabilities, the error correction information 160 may be generated from the four bytes 152, 154, 156, 158 of data when the four bytes 152, 154, 156, 158 are presumed to be correct.

For example, the error correction information may be generated from the four bytes 152, 154, 156, 158 of data when the four bytes 152, 154, 156, 158 are received by the memory device 100 and before the four bytes 152, 154, 156, 158 have been written to the memory array 120.

In some cases, the memory device 100 may be subject to multiple types of errors. For example, if a memory cell (e.g., the smallest circuit for storing data in the memory device 100, capable of storing a single bit) is incapable of storing data due to a defect, the error may be referred to as a hard error because the error may recur and be detectable during all operating conditions of the memory device 100. In other cases, if a memory cell is occasionally incapable of storing data due to a defect (e.g., if the error only occurs under some operating conditions), the error may be referred to as a soft error.

As an example of a soft error, data in a memory cell may be stored as a charge in a capacitor. As time passes, the charge in the capacitor may slowly leak away (e.g., discharge), resulting in loss of the stored data. In order to "refill" the discharging memory cell, the memory cell, along with other memory cells in the memory device 100 may occasionally be refreshed, thereby restoring the charge in the memory cell. In the case of a typical, properly functioning memory cell, a given minimum refresh rate may be sufficient to maintain the data stored in the memory cell. However, for memory cells with soft errors, the minimum refresh rate may not be sufficient to maintain the data stored in the memory cell (e.g., the data in the memory cell may be lost before a refresh occurs).

In some cases, soft errors in a memory cell may only occur or may have increased occurrence only under some operating conditions. For example, the memory device 100 may provide multiple refresh modes such as an auto-refresh mode which automatically refreshes memory cells in the memory array 120 using internal refresh circuitry and a given clock signal for timing and a self-refresh mode which uses internal refresh circuitry and an internal refresh counter for timing. In some cases, the self-refresh may be done with two different timings; e.g., a "regular" self-refresh timing and an "extended" self-refresh timing, with the latter having a longer refresh cycle. While the refresh rate for the auto-refresh mode and the "regular" self-refresh may be sufficient to prevent the occurrence of soft errors (e.g., leakage in a defective memory cell may be slow enough relative to the refresh rate such that the memory cell is refreshed without data loss), in some cases, the extended self-refresh timing may result in soft errors (e.g., the extended self-refresh mode may not be sufficient to correct leakage in the defective memory cell).

In some cases, temperature may also affect the occurrence of soft errors in a given memory cell. For example, as temperature increases, leakage of the charge in a memory cell may also increase. Under normal operating temperatures, a memory cell with a defect may not experience sufficient leakage to cause a soft error. However, under increased operating temperatures, the same memory cell with a defect may experience a soft error.

Because soft errors may be detectable only under certain operating conditions, soft errors may be more difficult to detect than hard errors. In some cases, the manufacturer of the memory device 100 may subject the memory device 100 to a testing procedure such as a burn-in wherein the memory device 100 is operated under strenuous operating conditions to detect both hard and soft errors. Where such errors are detected during manufacturing, the manufacturer may be able to correct such errors, for example, by using replacement memory cells as a substitute for the defective memory cells. For example, redundant wordlines may be used to replace wordlines containing defective memory cells, redundant bitlines may be used to replace bitlines containing defective memory cells, redundant cell blocks may be used to replace cell blocks containing defective memory cells, and other replacement schemes may also be used. However, in some cases, hard and soft errors may both remain undetected during testing by the manufacturer and may only become detectable during operation of the memory device 100 after manufacturing has been completed and/or after the memory device has been placed in a product.

In some cases, where a soft or hard error occurs, the error may be corrected using error correction information as described above. For example, if a soft error occurs in a single bit of one byte of the four bytes 152, 154, 156, 158, during a subsequent read operation the error correction information 160 may be used to detect and correct the error. However, in some cases, the soft error may remain undetected and cause errors in the operation of the memory device 100. For example, if a single byte error occurs in BYTE1 154 of the four bytes 152, 154, 156, 158, and if a subsequent single-byte write is performed to BYTE0 152, all four bytes 152, 154, 156, 158 (including BYTE1 154 which has an error) may be used to generate the error correction 160 information as described above. Because the error correction information 160 may be generated from data (e.g., BYTE1 154) which includes an undetected error, the error correction information 160 may be incorrect and thus may not be useful for identifying the error during subsequent error-checking operations (e.g., during a subsequent read operation which includes BYTE1 154).

As described below, embodiments of the invention may be used to prevent such errors from occurring with respect to the error correction information 160, thereby providing correct error correction information 160 which is useful for identifying an error during error-checking operations. While described above with respect to error correction information 160 which is used to correct a single bit error in four bytes 152, 154, 156, 158 of data, embodiments of the invention may be used with any type of error correction information for any number of bytes, including error correction for a single byte. Embodiments of the invention may also be used with a memory device 100 which performs any type of accesses of any number of bits, including a memory device which is not configured to perform single byte accesses. Also, embodiments of the invention may be used with both memory devices that provide self-refresh modes and/or auto-refresh modes as well as with memory device that do not provide self-refresh modes and/or auto-refresh modes.

One embodiment of the invention provides a method of correcting errors in a memory device. The method includes receiving a read command and a read address for the read command and reading data from a location in a memory array of the memory device corresponding to the read address. The method also includes reading error correction information corresponding to the read address and determining if the error correction information indicates an error in the data. If the error correction information indicates an error in the data, the error in the data is corrected to produce corrected data and the corrected data is output from the memory device. The corrected data is also written back to the location in the memory array of the memory device corresponding to the read address.

In some cases, by writing the corrected data back to the location in the memory array from which the incorrect data was read, subsequent errors may be corrected. For example, if the incorrect data resulted from a soft error, writing the corrected data back may maintain the corrected data in the memory array 120 until a subsequent refresh occurs, allowing the correct data to be refreshed and preventing another soft error from occurring. Writing the corrected data back may also maintain the corrected data in the memory array 120 until a subsequent write, such as a single byte write, occurs at the memory address, thereby providing correct data which may be used to generate correct error correction information 160. Using the correct error information 160, subsequent soft errors arising at the same memory address may be similarly corrected and/or corrected. Such error correction may be efficient for any use of the memory device 100, including where the memory device 100 is used to perform a large number of read accesses as compared to write accesses, such as in cell phone applications.

Figure 2:
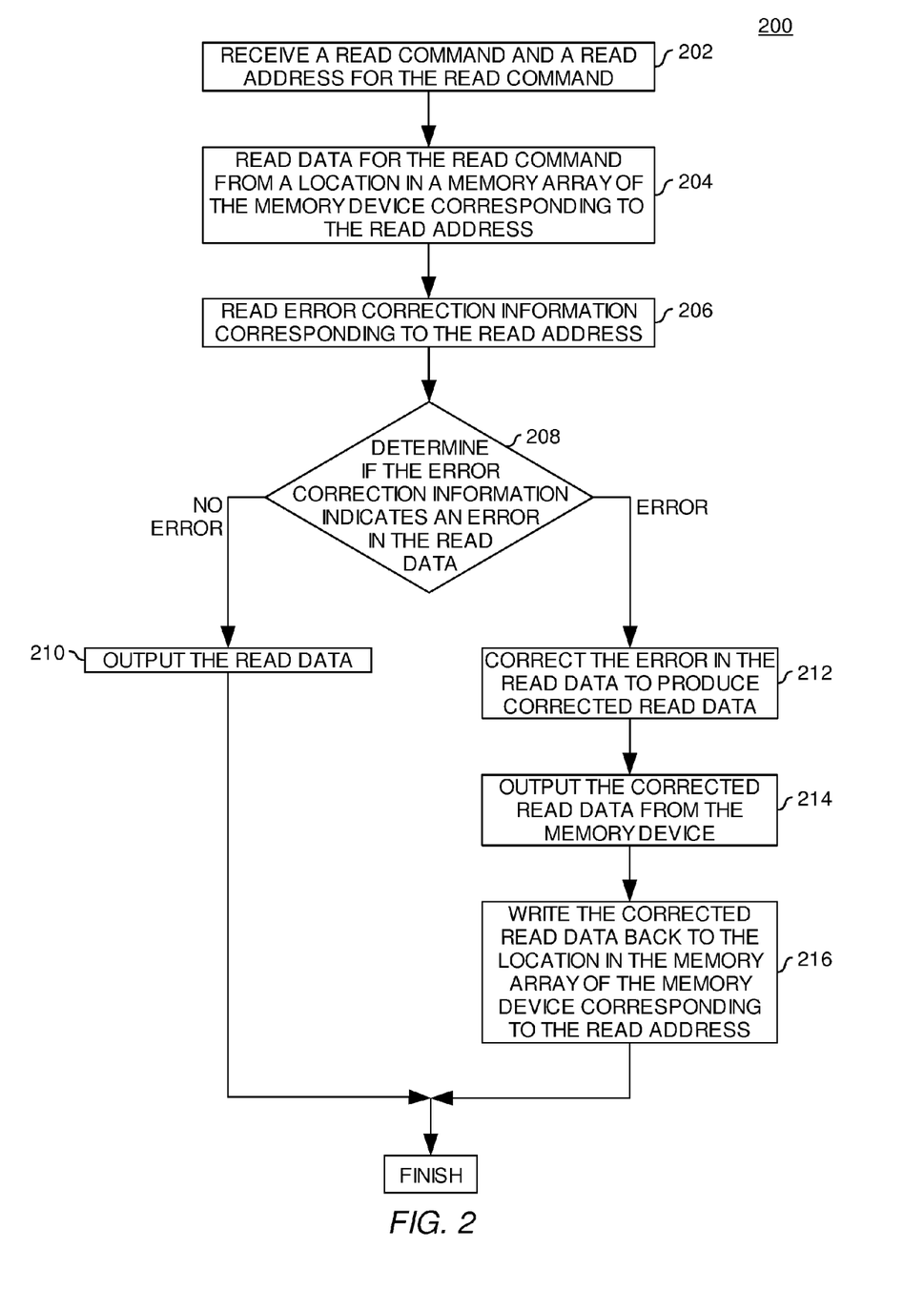
FIG. 2 is a flow diagram depicting a process for correcting errors in the memory device according to one embodiment of the invention.

FIG. 2 is a flow diagram depicting a process 200 for detecting and correcting errors in the memory device 100 according to one embodiment of the invention. The process 200 may begin at step 202 where a read command and a read address for the read command are received. At step 204, data may be read from a location in a memory array of the memory device corresponding to the read address. Also, at step 206, error correction information corresponding to the read address may be read, for example, from the memory array 120. At step 208, a determination may be made of whether the error correction information indicates an error in the data. If there is no error in the data, the data may be output at step 210.

If, however, there is an error in the data, then at step 212 the error in the data may be corrected to produce corrected data and at step 214 the corrected data may be output from the memory device 100. Also, at step 216, the corrected data may be written back to the location in the memory array of the memory device corresponding to the read address. As mentioned above, by writing the corrected data back to the location in the memory array 120, errors resulting from subsequent writes to the memory array 120 may be corrected.

Figure 3:
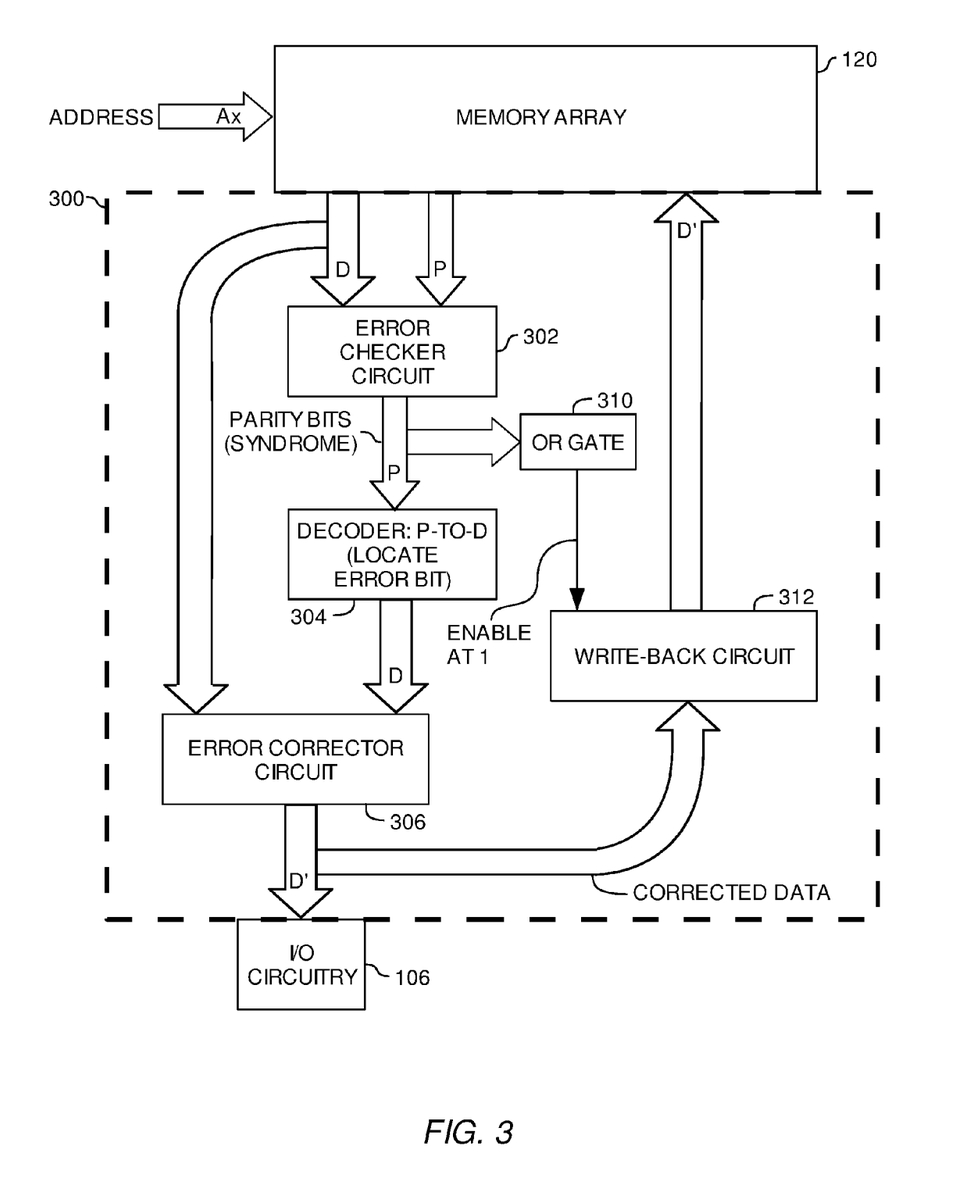
FIG. 3 is a block diagram depicting error correction circuitry according to one embodiment of the invention.

FIG. 3 is a block diagram depicting error correction circuitry 300 according to one embodiment of the invention. The depicted circuitry 300 may be configured, for example, to perform the process 200 depicted in FIG. 2. The depicted circuitry 300 may be included, for example, as part of the error correction circuitry 114 depicted in FIG. 1A. During a read access, the memory array 120 may receive a read address (Ax) and provide data (D) and error correction information (e.g., parity bits, P) to an error checker circuit 302. The error checker circuit 302 may be implemented by exclusive OR (XOR) logic, for example. The error checker circuit 302 may provide parity bits (Syndrome) to an OR gate 320 and a decoder 304. The decoder may locate an error bit, if any, in the received data and provide information to an error corrector circuit 306 which may be used to produce the corrected data (or the original data, if the original data was correct). The corrected data may then be output via I/O circuitry 106. The error corrector circuit 306 may be implemented by an exclusive OR (XOR) circuit, or other suitable device.

If the parity bits received by an OR gate 310 indicate that there is an error in the data received from the memory array 120, then the OR gate 310 may provide an enable signal to write-back circuitry 312 causing the corrected data to be written back to the read address Ax in the memory array 120. As described above, writing the corrected data back to the memory array 120 may maintain the corrected data in the memory array 120 throughout subsequent refreshes or until a subsequent write access occurs, allowing the correct data to be used and preventing another soft error from occurring.

Figure 4:
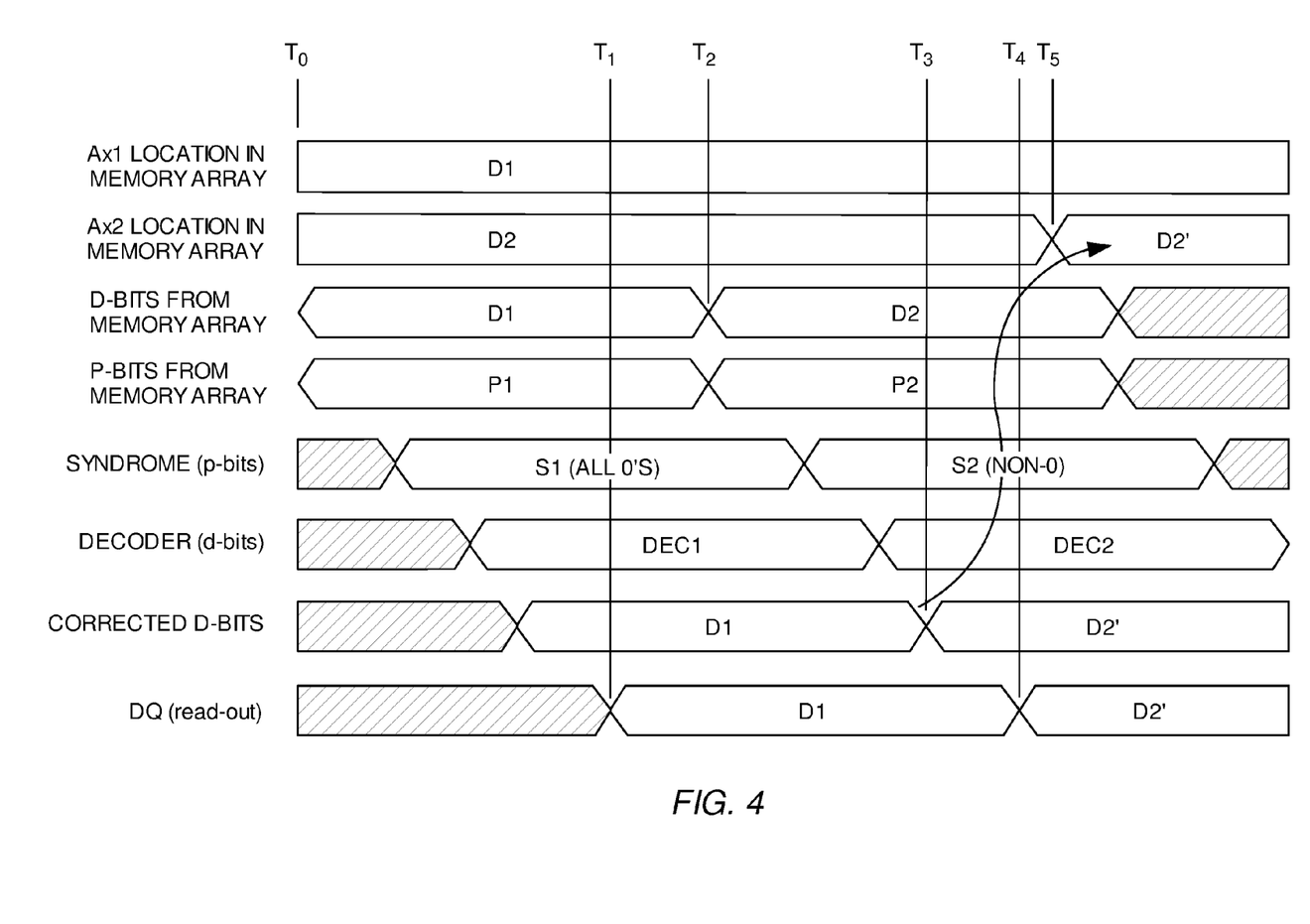
FIG. 4 is a timing diagram depicting operation of the error correction circuitry according to one embodiment of the invention.

FIG. 4 is a timing diagram depicting operation of the error correction circuitry 300 described with respect to FIG. 3 according to one embodiment of the invention. As depicted, at time T0 a first read access may occur at location Ax1 in memory. The data (D1) may pass through the error correction circuitry 300 as described above. As indicated by the p-bits (Syndrome) all being '0', the read access Ax1 may result in correct data D1 being retrieved from the memory array 120 and no write-back being performed. The data D1 may be output at time T1.

At time T2, a second read access may be performed to location Ax2 in the memory array 120. For the second read access, the p-bits may indicate an error in the data D2, and the error correction circuitry may provide corrected data D2' beginning at time T3. The corrected data D2' may be output at time T4, and at time T5 the corrected data D2' may be written back to the memory array 120.

In one embodiment of the invention, the memory device 100 may be configured such that the timing of the write-back operation does not interfere with the timing of subsequent accesses to the memory array 120. Also, in one embodiment of the invention, the memory array 120 may be provided with multiple access ports such that normal read and write accesses to the memory array 120 may be performed via a first access port while write-back accesses of corrected data may be performed via a second access port. In some cases, providing the second access port may improve the timing of the write-back operation as well as subsequent operations occurring after the write-back operation.

As mentioned above, writing the corrected data back to the memory array 120 may prevent subsequent errors, for example, in generating error correction information 160, from arising. In one embodiment of the invention, the write-back described above may only be performed under conditions which are likely to result in soft errors. For example, in one embodiment of the invention, the write-back may only be performed when the memory device 100 is placed in a self-refresh mode with an extended refresh period, when the memory device 100 is operated at an elevated temperature, and/or when the memory device is operated in a mode that uses single-byte writes. Optionally, the write-back may be performed each time an error is detected regardless of the operating conditions, as described above.

In one embodiment of the invention, corrected data may be written back to a memory storage location of the memory device 100 separate from the memory array 120. Subsequent accesses to the read address corresponding to the corrected data may be directed to the separate memory storage location instead of the original location within the memory array 120. In some cases, writing the corrected data back to a location separate from the memory array 120 may simplify timing of subsequent read and write operations.

For example, in some cases, writing corrected data back to the memory array 120 may not always prevent subsequent errors from occurring (even though it may reduce the probability of errors occurring). For example, where the error at the original location in the memory array 120 is a hard error, writing the corrected data back to the memory array 120 may not prevent the hard error from causing subsequent errors in the memory device 100. Also, in one embodiment, corrected data may be written back to both the memory array 120 and to a location separate from the memory array 120. For example, where a soft error is detected, the write-back circuitry 312 described above may be utilized whereas when a recurrent soft error and/or hard error is detected, the write-back circuitry described below may be utilized.

Figure 5:
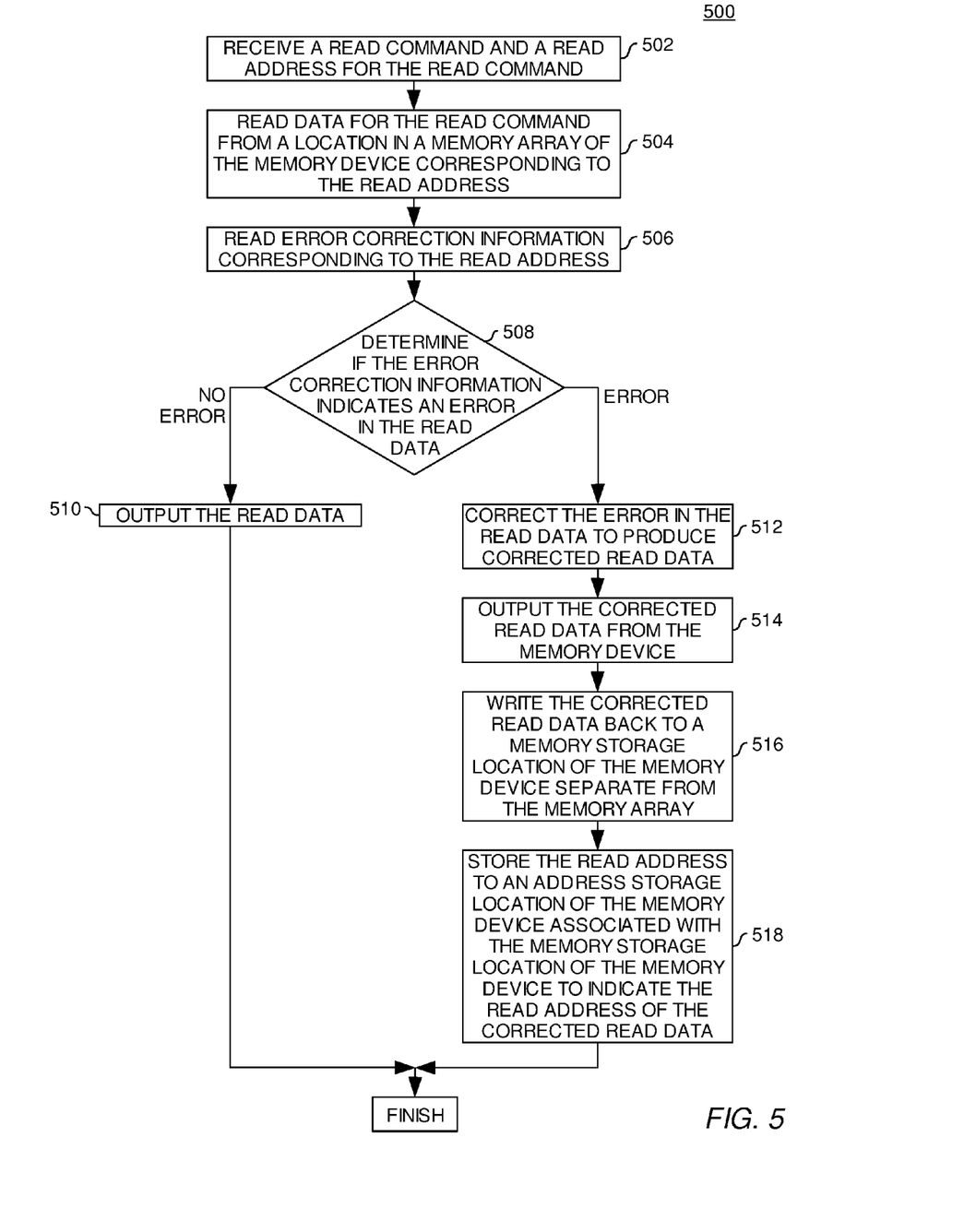
FIG. 5 is a timing diagram depicting a process for storing error information in the memory device according to one embodiment of the invention.

FIG. 5 is a flow diagram depicting a process 500 for storing error information in the memory device according to one embodiment of the invention. The process 500 may begin at step 502 where a read command and a read address for the read command are received. At step 504, data may be read from a location in a memory array of the memory device corresponding to the read address. Also, at step 506, error correction information corresponding to the read address may be read, for example, from the memory array 120. At step 508, a determination may be made of whether the error correction information indicates an error in the data. If there is no error in the data, the data may be output at step 510.

If, however, there is an error in the data, then at step 512 the error in the data may be corrected to produce corrected data and at step 514 the corrected data may be output from the memory device 100. At step 516, the corrected data may be stored to a memory storage location of the memory device separate from the memory array 120. Then at step 518, the read address may be stored to an address storage location of the memory device associated with the memory storage location of the memory device to indicate the read address of the corrected data.

Figure 6:
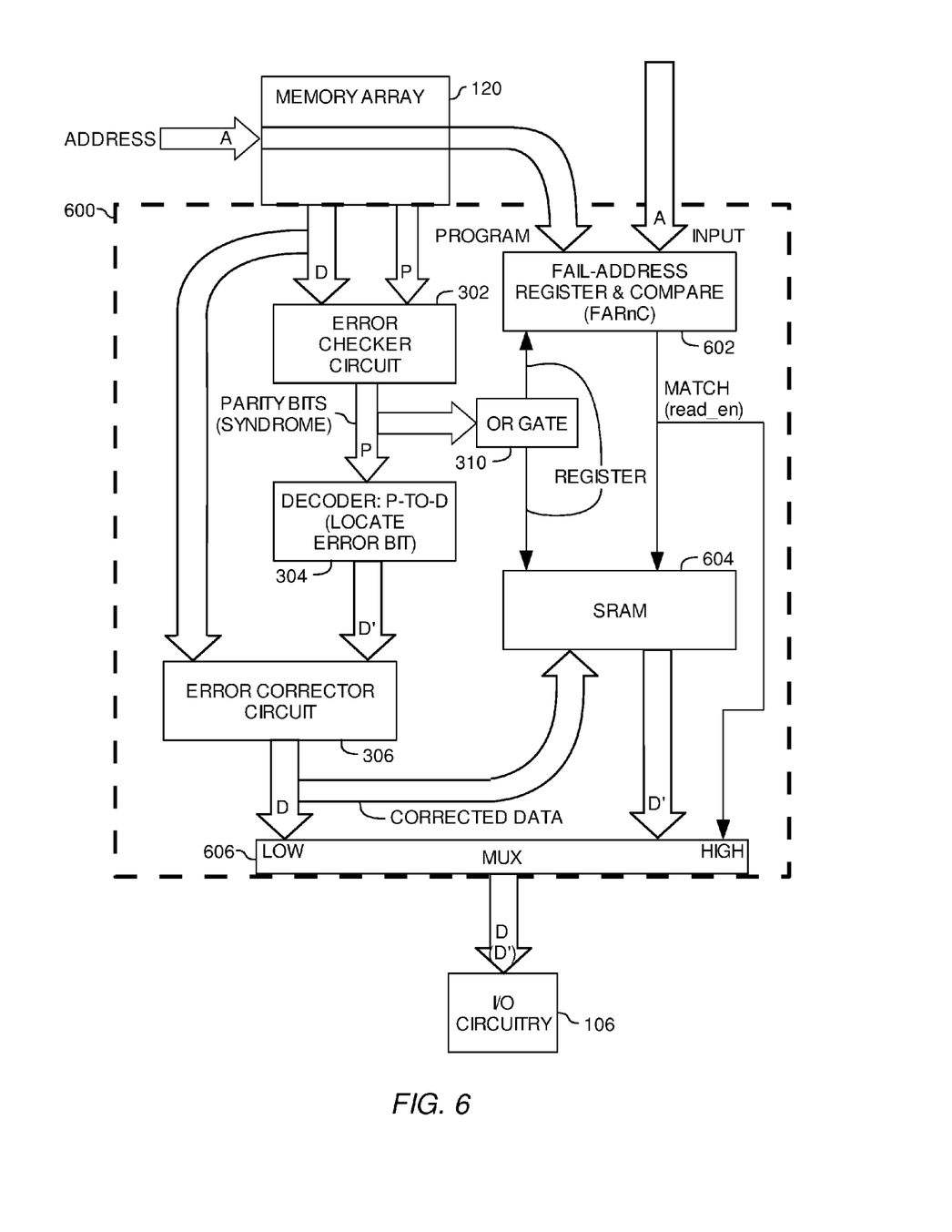
FIG. 6 is a block diagram depicting error correction circuitry for storing error information according to one embodiment of the invention.

FIG. 6 is a block diagram depicting error correction circuitry 600 for storing error information according to one embodiment of the invention. The error correction circuitry 600 may, for example, be included as part of the error correction circuitry 114 depicted with respect to FIG. 1A. In one embodiment, the location separate from the memory array 120 may be a static random access memory (SRAM) 604 (e.g., including one or more SRAM cells). Optionally, in one embodiment of the invention, a nonvolatile memory may be used instead of SRAM 604. For example, the nonvolatile memory may include an electrically-erasable programmable read-only memory (EEPROM), NAND flash memory, NOR flash memory, magnetic random access memory (MRAM), or any other type of nonvolatile memory. A fail address register and compare (FARnC) circuitry 602 may be used to store the read address (or addresses where multiple locations are provided) which is associated with the corrected data (if any) located in the SRAM 604. Where the FARnC circuitry 602 contains a read address which indicates that the SRAM 604 contains corrected data, the SRAM 604 may be used for subsequent accesses (e.g., reads and writes) to the read address.

In one embodiment of the invention, the error correction circuitry 600 may utilize similar error detection and correction circuits to the error correction circuitry 300 described above with respect to FIG. 3. For example, when a read address Ax is provided to the memory array 120 during a read access, data D and error correction information P may be provided to error checker circuit 302. The parity bits may then be used by the decoder 304 and error corrector circuit 306 to correct the data, if necessary. The data (or corrected data) may then be provided to the I/O circuitry 106 via the multiplexer (MUX) 606.

During the read access, if parity bits received from the error checker circuit 302 indicate an error in the data, the OR gate 310 may provide a signal indicating that an error has occurred to the FARnC circuit 602 and the SRAM 604. When the error signal is received by the FARnC circuit 602, the FARnC circuit 602 may register the read address for the data. Also, when the error signal is received by the SRAM 604, the SRAM 604 may read the corrected data. The read address and data may then be used for subsequent read and write accesses as described below.

During a read access, if the FARnC circuit 602 contains a stored address corresponding to the received read address A indicating that corrected data is located in the SRAM 604, then the FARnC may provide a signal to the SRAM 604 and the MUX 606 indicating a match between the received read address and the stored address. Upon receiving the signal indicating the match, the SRAM 604 may output the previously stored data to the MUX 606 which may provide the corrected data to the I/O circuitry 106. If the FARnC circuit 602 does not indicate that a received read address matches a stored address (if any), then the read access may proceed using data from the memory array 120 as described above.

In one embodiment, the SRAM 604 and FARnC circuit 602 may only store a single data entry and a single corresponding data address, respectively. For example, the first time incorrect data is detected, the SRAM 604 and FARnC circuit 602 may store the corrected data and corresponding read address and use the corrected data and corresponding read address for all subsequent operations of the memory device 100 (e.g., until the memory device 100 is powered down, at which time the stored data and read address in the volatile memory of the SRAM 604 and FARnC circuit 602 may be erased).

Optionally, in one embodiment of the invention, each time a read access indicates that data received from the memory array 120 is incorrect, the data and read address may be written to the SRAM 604 and the FARnC circuit 602, even if the data and read address overwrite previous addresses and data stored in the SRAM 604 and the FARnC circuit 602. Also, in one embodiment of the invention, multiple read addresses (e.g., two, three, or more entries may be provided) and multiple corresponding corrected data entries and addresses may be stored in the FARnC circuit 602 and SRAM 604. The multiple entries may either remain in the FARnC circuit 602 and SRAM 604 (e.g., even if new errors are detected) or may replaced with the most recently corrected data and corresponding addresses.

Figure 7:
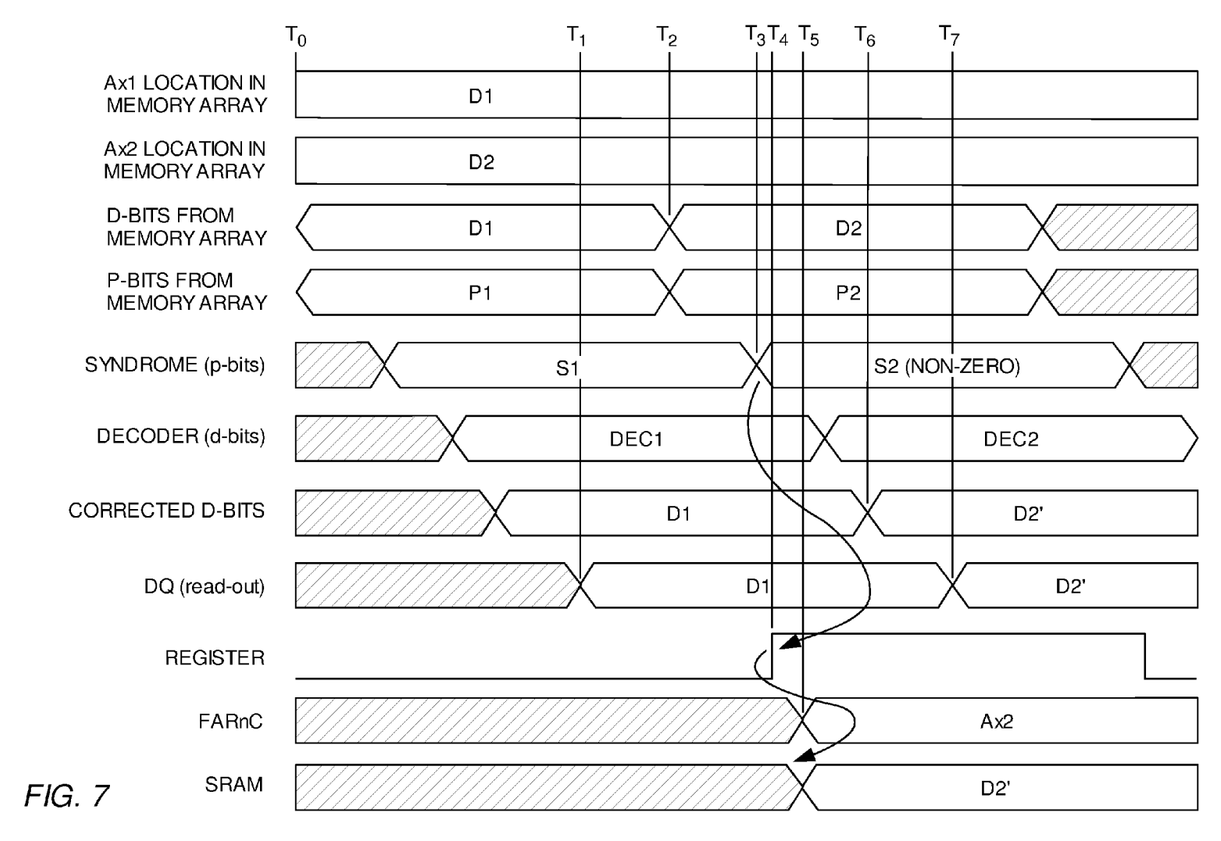
FIG. 7 is a timing diagram depicting operation of the error correction circuitry according to one embodiment of the invention.

FIG. 7 is a timing diagram depicting operation of the error correction circuitry 600 according to one embodiment of the invention. As depicted, at time T0 a first read access may occur at location Ax1 in memory. The data (D1) may pass through the error correction circuitry 600 as described above. As indicated by the p-bits (Syndrome) all being '0', the read access Ax1 may result in correct data D1 being retrieved from the memory array 120 and no write-back being performed. The data D1 may be output at time T1.

At time T2, a second read access may be performed to location Ax2 in the memory array 120. For the second read access, the p-bits may indicate an error in the data D2 at time T3. Upon determining that the data D2 has an error, the OR gate 310 may assert a signal (Register) to the FARnC circuit 602 and SRAM 604 indicating that the error has occurred. Upon receiving the signal indicating the error at time T4, the FARnC circuit 602 may record the read address Ax2 at time T5 and the SRAM 604 may prepare at time to latch the corrected data D2' when the corrected data D2' becomes available at time T6. The corrected data may also be output via the I/O circuitry 106 at time T7. Furthermore, as depicted, storing the read address and the data may not interfere with the timing of the read operation or with the timing of subsequent read operations.

Figure 8:
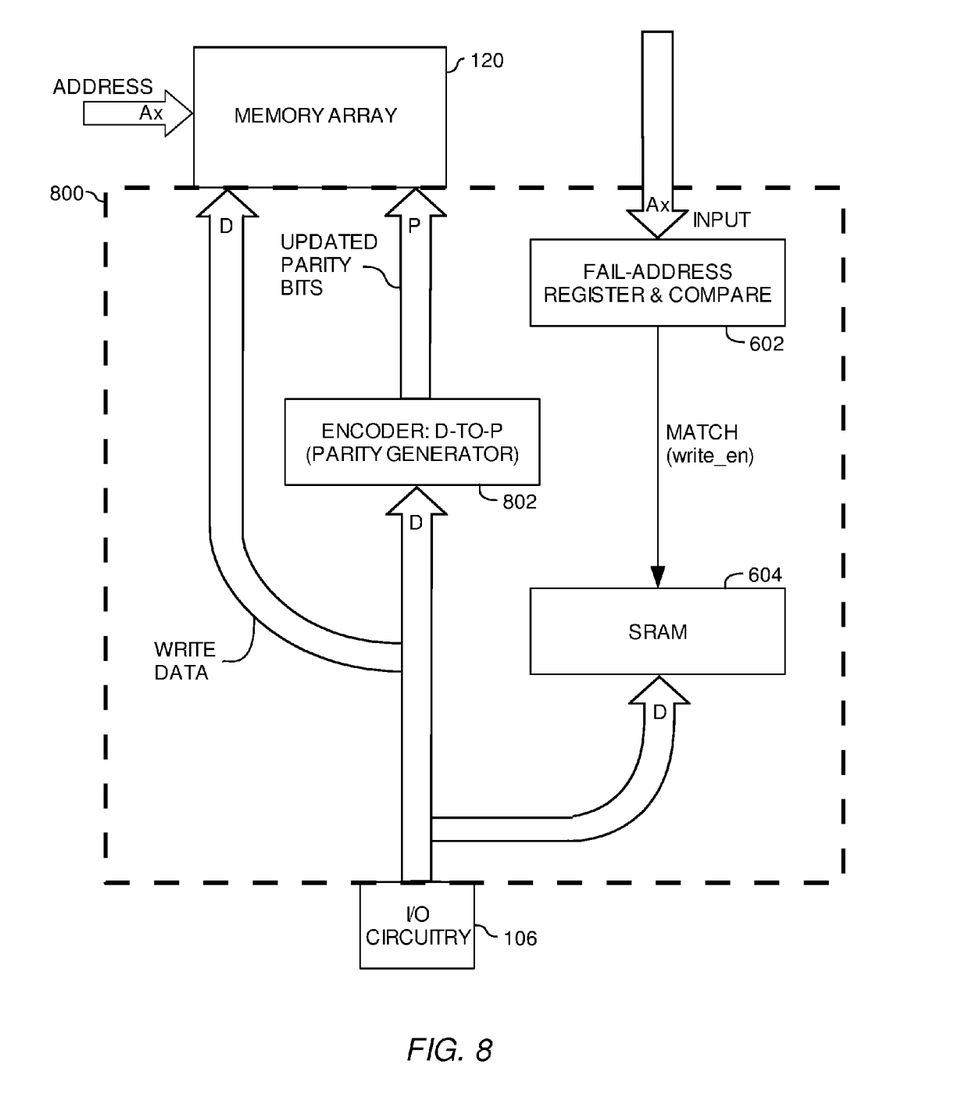
FIG. 8 is a block diagram depicting error correction circuitry for performing a write operation according to one embodiment of the invention.

As described above, after corrected data and the corresponding address are placed in the FARnC circuit 602 and SRAM 604, subsequent accesses to the corresponding address such as read accesses (described above) and write accesses may be performed using the data in the SRAM 604. FIG. 8 is a block diagram depicting error correction circuitry 800 for performing a write operation according to one embodiment of the invention. The error correction circuitry 800 may, for example, be included as part of the error correction circuitry 114 depicted with respect to FIG. 1A. In one embodiment of the invention, when write data and a write address is received, the write data may be processed by an encoder circuit 802 which produces error correction information 160 for the write data. The write data and the error correction information 160 may then be provided to the memory array 120. In some cases, where a single byte write is performed to a group of data, the data may also be read from the memory array 120 and used by the encoder 802 to generate the error correction information 160.

In one embodiment, during a write access, the write address may also be provided to the FARnC circuit 602. The FARnC circuit 602 may determine whether the write address matches a stored address indicating that data for the write address should be accessed via the SRAM 604. If the FARnC circuit 602 indicates that the write address does match a stored address, the FARnC circuit 602 may assert a match signal to the SRAM 604 thereby causing the SRAM 604 to input the write data. As described above, subsequent read or write accesses to the address stored in the FARnC circuit 602 may then access the write data in the SRAM 604.

While depicted above with respect to read and write data stored in an SRAM 604 which does not include error correction information, other embodiments of the invention may provide error correction information for the data stored in the SRAM 604. For example, data output from and input to the SRAM 604 may also be passed through error correction and detection circuits (302, 304, 306, and 802) described above when accessing the data. Thus, in some cases, the SRAM 604 may also be used to store error correction information 160 for the data stored therein. Optionally, the error correction information may be stored at the location in the memory array 120 at the corresponding address (e.g., the same address as the address stored in the FARnC circuit 602) in the memory array 120. In one embodiment, if the data in the SRAM 604 is corrected, then the corrected data may be written back to the SRAM 604.

As described above, in one embodiment of the invention, the SRAM 604 and FARnC circuit 602 may provide volatile memory locations for storing and accessing corrected data and corresponding addresses for the corrected data. Because the SRAM 604 and FARnC circuit 602 may provide volatile memory locations for storing such information, when the memory device 100 is powered down, the stored information in the volatile memory of the SRAM 604 and FARnC circuit 602 may be erased. Thus, in some cases, when the memory device 100 is powered up, the memory device 100 may not have a record of some previously occurring hard and/or soft errors.

Figure 9:
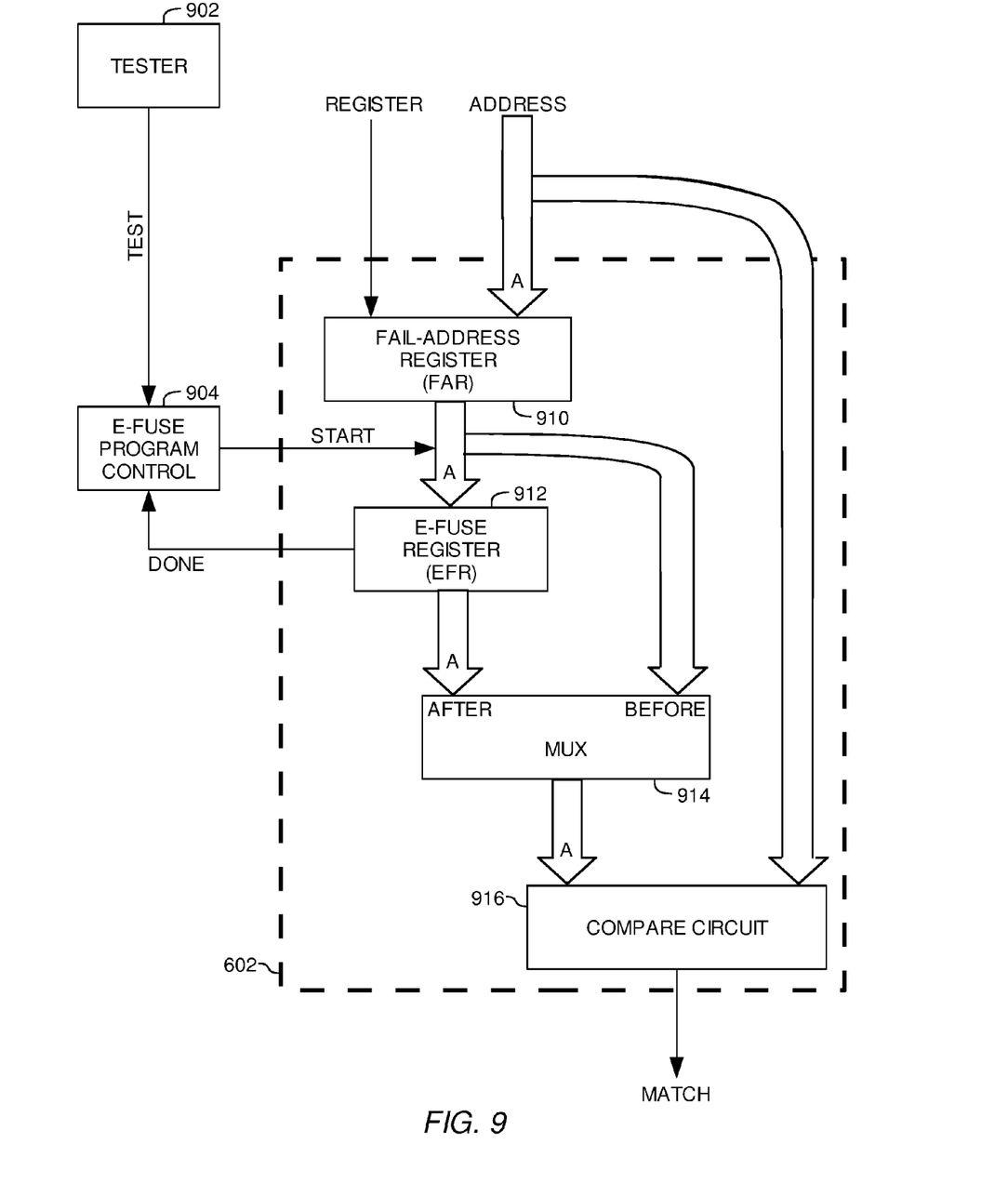
FIG. 9 is a block diagram depicting error correction circuitry with fuses configured to store error information according to one embodiment of the invention.

In one embodiment of the invention, fuse circuitry may be used to provide nonvolatile memory for storing a record of one or more memory addresses which previously experienced hard and/or soft errors. FIG. 9 is a block diagram depicting error correction circuitry with fuses configured to store error information according to one embodiment of the invention. By storing a record of one or more memory addresses which previously experienced errors in nonvolatile fuse memory, subsequent accesses to those memory addresses, even after the memory device 100 has been powered down or reset, may be redirected using the FARnC circuit 602 (depicted above with respect to FIG. 6, which may be included, for example, in the error correction circuitry 114 depicted with respect to FIG. 1A) and SRAM 604 as described above. Also, embodiments of the invention may also be utilized with other types of nonvolatile memory besides fuses. For example, the fuses described with respect to FIG. 9 may also be replaced with nonvolatile memory including electrically-erasable programmable read-only memory (EEPROM), NAND flash memory, NOR flash memory, magnetic random access memory (MRAM), or any other type of nonvolatile memory.

In one embodiment of the invention, a tester 902 and e-fuse program control circuitry may be used to test the memory device 100 for errors and record one or more addresses at which errors in the memory device 100 occur. The tester 902 may either be on-chip testing circuitry (e.g., included as part of the error correction circuitry 114 depicted with respect to FIG. 1A) or, optionally, an external device operated by a manufacturer using the memory device 100. Similarly, the e-fuse program control circuitry 904 may either be an on-chip circuit (e.g., included as part of the error correction circuitry 114 depicted with respect to FIG. 1A and controlled by an external or internal tester 902) or an external device. In some cases, testing may only be performed during manufacturing of the memory device 100 or larger devices which include the memory device 100. Optionally, testing may be performed using in-chip circuitry after the memory device 100 has been provided as part of a final product.

In one embodiment, the tester 902 may be used to detect any uncorrected hard and/or soft errors in the memory device 100. For example, the tester 902 may run a test program configured to place the memory device 100 in a test mode and determine any memory addresses in the memory array 120 which experience hard and/or soft errors. For example, the tester 902 may issue access commands to the memory device in a manner designed to detect errors in the memory array 120, and one or more addresses indicating the location of the errors may be stored in a fail address register (FAR) 910 in the FARnC circuit 602 as described above. After the tester 902 has determined which address, if any, is experiencing a hard or soft error, the tester 902 may assert an e-fuse program signal (TEST) to the e-fuse program control circuit 904.

Upon detecting the asserted e-fuse program signal, the e-fuse program control circuit 904 may assert an e-fuse program start signal (START) which may be applied to the FARnC circuit 602. Upon receiving the asserted e-fuse program start signal, the e-fuse register 912 may be activated and may store the address from the fail address register 910 in the e-fuses within the register 912. After the e-fuse register 912 has finished storing the failing address in the non-volatile e-fuses, the e-fuse register 912 may assert a signal (DONE) indicating that the failing address has been stored. Upon receiving the asserted DONE signal, the e-fuse program control may cease the programming by lowering the e-fuse program start signal (TEST).

In one embodiment of the invention, during operation of the FARnC circuit 602, a compare circuit 916 may be used to compare an address stored in the FARnC circuit 602 to a received memory address to determine if the SRAM 604 should be used to access the received memory address. As described above, if the comparison indicates a match, then any access to the requested memory address may be directed to the SRAM 604. In some cases, a multiplexer 914 may be used to select which address location to use for comparison. For example, before the e-fuse register 912 has been programmed, any address in the fail address register 910 may be used to perform the comparison. After the e-fuse register 912 has been programmed (if at all), then any address stored in the e-fuse register 912 may be used to perform the comparison. Also, as described above, after the e-fuse register 912 has been programmed, the address programmed into the e-fuse register 912 may be used for comparison (e.g., to determine if there is an error at that address) even after the memory device 100 has been powered down or reset.

Figure 10:
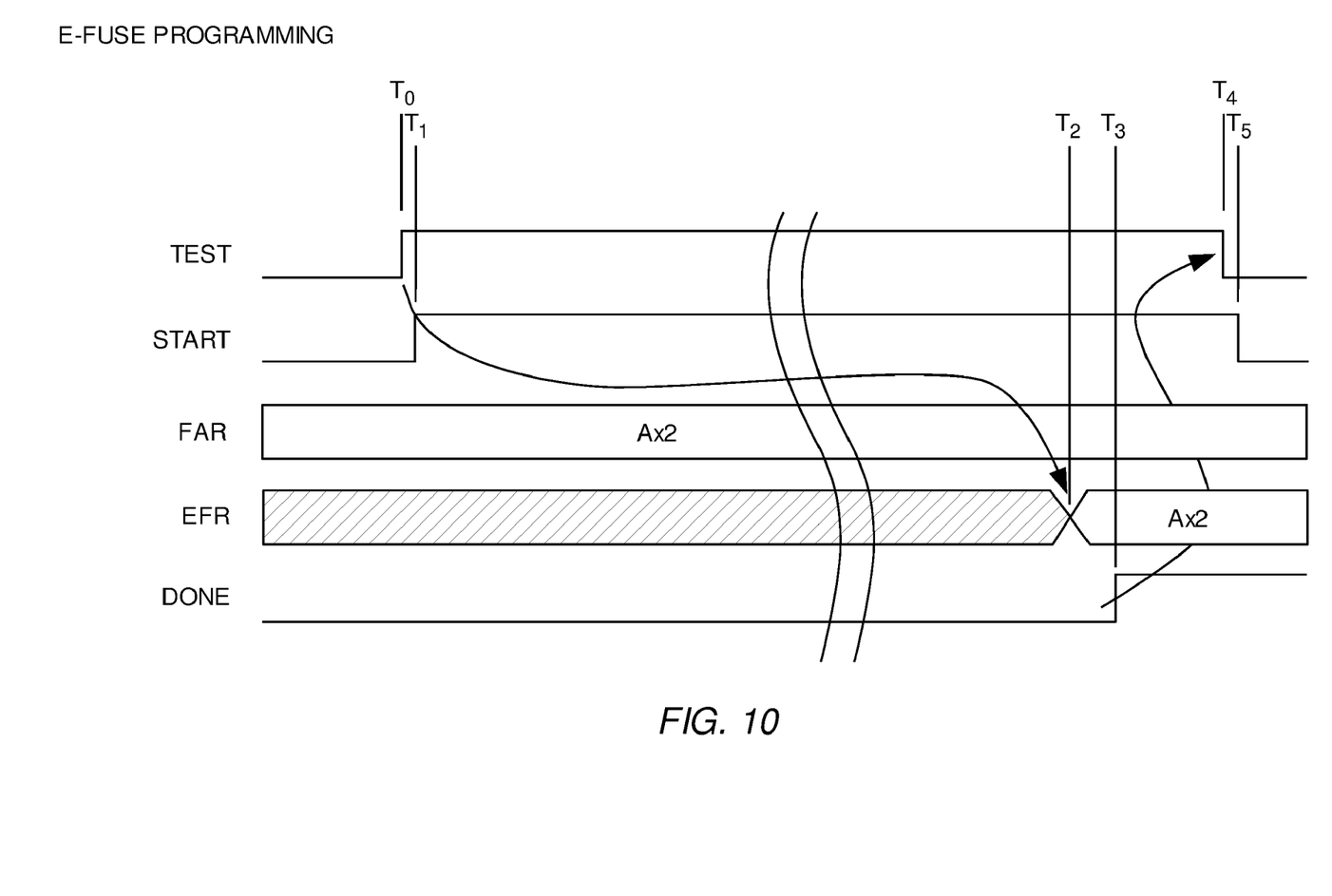
FIG. 10 is a timing diagram depicting a fuse programming operation according to one embodiment of the invention.

FIG. 10 is a timing diagram depicting a fuse programming operation according to one embodiment of the invention. As depicted, the fuse programming operation may begin at time T0 where the TEST signal is asserted by the tester 902 and received by the e-fuse program control circuit 904, thereby indicating that the e-fuse program should be started. The e-fuse programming may then start at time T1 when the e-fuse program control circuit 904 asserts the START signal which is provided by the e-fuse program control circuit 904 to the e-fuse register 912.

When the e-fuse register 912 receives the asserted START signal, the e-fuse register 912 may begin storing the address (in the depicted case, Ax2) provided by the fail address register 910. After the address Ax2 is successfully stored in the e-fuse register 912 at time T2, the DONE signal may be asserted by the e-fuse register 912 at time T3 to indicate that the address has been stored. When the asserted DONE signal is received by the tester 902 and e-fuse program control circuit 904, the TEST and START signals may be lowered at times T4 and T5, respectively, thereby completing the e-fuse register programming operation. As described above, the programmed address (Ax2) may then be used to direct subsequent accesses to that address to the SRAM 604 as described above.

While the foregoing is directed to embodiments of the present invention, other and further embodiments of the invention may be devised without departing from the basic scope thereof, and the scope thereof is determined by the claims that follow.

What is claimed is:

1. A method of correcting errors in a memory device, comprising:
    receiving a read command and a read address for the read command;
    reading data from a first location of the memory array corresponding to the read address;
    reading error correction information corresponding to the read address;
    producing corrected data when the error correction information indicates an error in the data; and
    writing the corrected data to a second location corresponding to the read address in a nonvolatile memory separate from the memory array.

2. The method of claim 1, wherein the memory device is a dynamic random access memory device.

3. The method of claim 1, wherein reading error correction information corresponding to the read address comprises:
    reading the error correction information from a location in a memory array of the memory device corresponding to the read address.

4. The method of claim 1, wherein the error correction information provides single bit error correction for a group of four data addresses in the memory device.

5. The method of claim 4, wherein the memory device is configured to provide write accesses for single data addresses.

6. A method of correcting errors in a memory device, comprising:
    receiving a read command and a read address for the read command;
    reading data from a location in a memory array of the memory device corresponding to the read address;
    reading error correction information corresponding to the read address;
    producing corrected data when the error correction information indicates an error in the data; and
    writing the corrected data to a location corresponding to the read address in a nonvolatile memory separate from the memory array.

7. The method of claim 6, wherein the memory device is a dynamic random access memory device.

8. The method of claim 6, wherein the memory array includes a first port and a second port, wherein reading the data from the location in the memory array comprises reading the data from the first port, and wherein writing the corrected data to the location in the memory array comprises writing the corrected data to the second port.

9. The method of claim 6, wherein reading error correction information corresponding to the read address comprises:
    reading the error correction information from the location in the memory array corresponding to the read address.

10. The method of claim 7, wherein the error correction information provides single bit error correction for a group of four data addresses in the memory array.

11. The method of claim 10, wherein the memory device is configured to provide write accesses for single data addresses in the memory array.

12. A memory device, comprising:
    a memory array;
    a nonvolatile memory separate from the memory array; and
    circuitry configured to:
        receive a read command and a read address for the read command;
        retrieve data from a location in the memory array corresponding to the read address;
        read error correction information corresponding to the read address;
        produce corrected data when the error correction information indicates an error in the data; and
        write the corrected data to a location corresponding to the read address in the nonvolatile memory separate from the memory array.

13. The memory device of claim 12, wherein the memory device is a dynamic random access memory device.

14. The memory device of claim 12, wherein the memory array includes a first port and a second port, and wherein the circuitry is configured to read the data from the first port and write the corrected data back to the location in the memory array via the second port.

15. The memory device of claim 12, wherein reading error correction information corresponding to the read address comprises:
    reading the error correction information from the location in the memory array corresponding to the read address.

16. The memory device of claim 12, wherein the error correction information provides single bit error correction for a group of four data addresses in the memory array.

17. The memory device of claim 16, wherein the memory device is configured to provide write accesses for single data addresses in the memory array.

18. A method of correcting errors in a memory device, comprising:
    receiving a read command and a read address for the read command;
    reading data from a location in a memory array of the memory device corresponding to the read address;
    reading error correction information corresponding to the read address;
    producing corrected data when the error correction information indicates an error in the data;
    storing the corrected data to a nonvolatile memory storage location of the memory device separate from the memory array; and
    storing the read address to an address storage location of the memory device associated with the memory storage location of the memory device to indicate the read address of the corrected data in the nonvolatile memory storage location.

19. The method of claim 18, wherein the memory array comprises dynamic random access memory, and wherein the memory storage location comprises static random access memory.

20. The method of claim 18, further comprising:
receiving an access command and an access address for the access command; and in response to receiving the access command:
determining if the access address matches the read address stored in the address storage location;
using the access command to access the corrected data stored in the memory storage location if the access address matches the read address; and
using the access command to access the first location in the memory array of the memory device if the access address does not match the read address.

21. The method of claim 18, wherein the address storage location is a register.

22. The method of claim 18, wherein reading error correction information corresponding to the read address comprises:
reading the error correction information from the location in the memory array corresponding to the read address.

23. The method of claim 18, wherein the error correction information provides single bit error correction for a group of four data addresses in the memory array.

24. The method of claim 23, wherein the memory device is configured to provide write accesses for single data addresses in the memory array.

25. The method of claim 18, wherein the address storage location of the memory device comprises non-volatile memory configured to store the read address.

26. A memory device, comprising:
a memory array;
a nonvolatile memory separate from the memory array; and
circuitry configured to:
receive a read command and a read address for the read command;
retrieve data from a first location in the memory array corresponding to the read address;
read error correction information corresponding to the read address;
produce corrected data when the error correction information indicates an error in the data;
store the corrected data to a memory storage location in the nonvolatile memory separate from the memory array; and
store the read address to an address storage location of the memory device associated with the memory storage location of the memory device to indicate the read address of the corrected data.

27. The memory device of claim 26, wherein the memory array comprises dynamic random access memory, and wherein the memory storage location comprises static random access memory.

28. The memory device of claim 26, wherein the circuitry is further configured to:
receive an access command and an access address for the access command; and
in response to receiving the access command:
determine if the access address matches the read address stored in the address storage location;
use the access command to access the corrected data stored in the memory storage location if the access address matches the read address; and
use the access command to access the first location in the memory array of the memory device if the access address does not match the read address.

29. The memory device of claim 26, wherein the address storage location is a register.

30. The memory device of claim 26, wherein reading error correction information corresponding to the read address comprises:
reading the error correction information from the location in the memory array corresponding to the read address.

31. The memory device of claim 26, wherein the error correction information provides single bit error correction for a group of four data addresses in the memory array.

32. The memory device of claim 31, wherein the memory device is configured to provide write accesses for single data addresses in the memory array.

33. The memory device of claim 26, wherein the address storage location of the memory device comprises non-volatile memory configured to store the read address.

* * * * *